(12) United States Patent
Shimoshikiryo et al.

(10) Patent No.: US 6,195,145 B1
(45) Date of Patent: Feb. 27, 2001

(54) LIQUID CRYSTAL DISPLAY DEVICE

(75) Inventors: Fumikazu Shimoshikiryo, Tenri; Shuichi Kozaki, Nara; Teruyoshi Hara, Yamatokoriyama; Koichi Miyachi, Tenri, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 08/942,355

(22) Filed: Oct. 1, 1997

(30) Foreign Application Priority Data

Oct. 4, 1996 (JP) .................................................. 8-264927
Sep. 4, 1997 (JP) .................................................. 9-240084

(51) Int. Cl.⁷ .......................... G02F 1/1337; C09K 19/02
(52) U.S. Cl. .................................... 349/123; 349/186
(58) Field of Search ............................ 349/33, 123, 136, 349/171, 172, 141, 186

(56) References Cited

U.S. PATENT DOCUMENTS

| | | | |
|---|---|---|---|
| 3,914,020 | * 10/1975 | Helfrich | 349/128 |
| 5,189,534 | * 2/1993 | McDonell et al. | 349/168 |
| 5,446,569 | * 8/1995 | Iwai et al. | 349/124 |
| 5,493,426 | * 2/1996 | Johnson et al. | 349/171 |
| 5,598,285 | * 1/1997 | Kondo et al. | 349/141 |
| 5,658,492 | * 8/1997 | Murashiro et al. | 349/184 |
| 5,781,261 | * 7/1998 | Ohta et al. | 349/143 |

FOREIGN PATENT DOCUMENTS 6-160878   6/1994  (JP) .
9-297293   * 11/1997  (JP) .

OTHER PUBLICATIONS

S.I.D, "Ferroelectric smetic (FLC)– LCDs", vol. II, pp. 12.12–12.38, May 1989.*

* cited by examiner

Primary Examiner—William L. Sikes
Assistant Examiner—Dung Nguyen
(74) Attorney, Agent, or Firm—Nixon & Vanderhye P.C.

(57) ABSTRACT

A liquid crystal display device of the present invention includes: a pair of substrates; a liquid crystal layer provided between the substrates; and a transverse electric field generating electrode capable of being driven in a matrix driving manner which is provided on at least one of the pair of substrates and is connected to external control means. Each of the pair of substrates is provided with alignment means for aligning liquid crystal molecules in the liquid crystal layer so that the liquid crystal layer has spontaneous polarization generally parallel to a surface of the substrate.

9 Claims, 10 Drawing Sheets

LIQUID CRYSTAL DISPLAY DEVICE

BACKGROUND OF THE INVENTION

1. Field of the Invention

The present invention relates to a matrix driving type transverse electric field type liquid crystal display device of a novel display mode. More particularly, the present invention relates to a matrix driving type transverse electric field type liquid crystal display device of a novel display mode using a nematic liquid crystal material which is oriented by an alignment treatment so as to have spontaneous polarization.

2. Description of the Related Art

A transverse electric field type liquid crystal display device has been conventionally known. The transverse electric field type liquid crystal display device has a liquid crystal layer between a pair of substrates, the liquid crystal layer containing a nematic liquid crystal material oriented parallel to the substrate surface, whereby the device is driven by an applied transverse electric field and by utilizing dielectric anisotropy of the nematic liquid crystal material (e.g., Japanese Laid-Open Patent Publication No. 6-160878).

The transverse electric field type liquid crystal display device has problems such as a low aperture ratio and a low response speed. Referring to FIGS. 10A to 10D, the configuration of a conventional transverse electric field type liquid crystal display device and the problems associated therewith will be described.

The liquid crystal display device includes a liquid crystal panel. The liquid crystal panel includes a pair of substrates 203 and 203, transverse electric field electrodes 201 and 202 both of which are provided on one of the substrates, alignment films 204 and 204 each provided on one of the substrates on the liquid crystal layer side thereof, and a liquid crystal layer 210 as a display medium. The liquid crystal display device further includes polarizers 206 and 206 provided external to the liquid crystal panel. In the conventional transverse electric field type liquid crystal display device, in the absence of an applied voltage, liquid crystal molecules 205 contained in the liquid crystal layer 210 are not twisted between the pair of substrates 203 and 203 but are oriented generally parallel to the substrate 203, as shown in FIGS. 10A and 10C. Each of the substrates is provided with the polarizer 206 in such a manner that the direction of a polarization axis 209 of one polarizer 206 is identical to the direction of a molecular axis 208 of the liquid crystal molecules 205 while the direction of a polarization axis 209 of the other polarizer 206 is orthogonal to the direction of the molecular axis 208 of the liquid crystal molecules 205. For example, in the liquid crystal display device of the above-identified publication, the optical axis of linearly-polarized light which has passed through a polarizer provided on a lower substrate (hereinafter, referred to as the "lower polarizer"), i.e., the transmission axis of the lower polarizer, is identical to the molecular axis of the liquid crystal molecules. Therefore, there is no birefringence generated by the liquid crystal layer. As a result, the linearly-polarized light coming from the lower side of the liquid crystal panel reaches another polarizer provided on an upper substrate (hereinafter, referred to as the "upper polarizer") without becoming elliptically-polarized light or changing the direction of its optical axis, whereby the linearly-polarized light is blocked by the upper polarizer.

On the other hand, as shown in FIGS. 10B and 10D, when an electric field E is applied in a direction 207 which is at a certain angle with respect to the molecular axis direction 208 of the liquid crystal molecules 205 and is generally parallel to the substrate surface, due to the dielectric anisotropy of the liquid crystal molecules 205, the liquid crystal molecules 205 rotate in a plane parallel to the substrate surface so that the minor axis thereof is orthogonal to the line of electric force. As a result, the optical axis of the linearly-polarized light which has passed through the lower polarizer is shifted with respect to that of the liquid crystal molecules, whereby the light coming from the lower side of the liquid crystal panel passes through the upper polarizer.

The aperture ratio of the conventional transverse electric field type liquid crystal display device is low because the liquid crystal molecules are driven based upon the dielectric anisotropy. In order to maximize the transmission in the conventional liquid crystal display device, the liquid crystal molecules therein must be rotated by 45°. The field strength required for rotating the liquid crystal molecules may vary depending upon the dielectric anisotropy and the elastic constant of the liquid crystal molecules, and the like, but is about 1 V/$\mu$m for a commonly-employed liquid crystal material. When a liquid crystal display device having an ordinary pixel size is produced using an ordinary liquid crystal material, the short side of a pixel is about 80 $\mu$m long. Accordingly, a driving voltage of about 80 V is required to be applied between the transverse electric field electrodes 201 and 202. However, such a driving voltage, as high as about 80 V, is not practical for an ordinary matrix driving type liquid crystal display device. Therefore, in the conventional liquid crystal display device, an additional electrode (not shown) needs to be provided between the electrodes 201 and 202 in FIGS. 10A to 10D in order to reduce the interval between two electrodes and thus the driving voltage required therebetween. As a result, the additional electrode creates an additional light-blocking portion, thereby lowering the aperture ratio of the liquid crystal display device.

A high contrast display is not easily achieved in the conventional transverse electric field type liquid crystal display device due to the configuration thereof. As described above, in order to block light in the absence of an applied voltage, the direction of the polarization axis of one polarizer (e.g., the transmission axis of the lower polarizer) needs to be identical to the molecular axis direction of the liquid crystal molecules while the direction of the polarization axis of the other polarizer (e.g., the transmission axis of the upper polarizer) needs to be orthogonal to the molecular axis direction of the liquid crystal molecules. For example, if the polarization axis of the lower polarizer is not identical to the molecular axis of the liquid crystal molecules, linearly-polarized light which has passed through the lower polarizer becomes elliptically-polarized light due to the birefringence of the liquid crystal layer, and thus passes through the upper polarizer. Therefore, in order to achieve a high contrast display, it is necessary for the direction of the alignment treatment (e.g., rubbing treatment) for the upper substrate to be precisely identical to that for the lower substrate, for the direction of the alignment treatment to be precisely identical to the polarization axis direction of one of the polarizers, and for the direction of the alignment treatment to be precisely orthogonal to the polarization axis direction of the polarizer. However, when actually producing a liquid crystal display device, it is very difficult to precisely arrange these components as described above. Accordingly, it is very difficult to achieve a high contrast display with the conventional transverse electric field type liquid crystal display device. Moreover, the productivity of the manufacturing process of such a liquid crystal display device is very low due to the precise arrangement of the components being required.

The response speed is low in the conventional liquid crystal display device for the following reason. The response speed can be generally classified into two factors, i.e., one factor associated with an increase in the applied voltage and one factor associated with a decrease in the applied voltage. The factor which is of particular importance in the conventional liquid crystal display device is the one associated with a decrease in the applied voltage. In the conventional liquid crystal display device, the liquid crystal molecules are driven based upon the dielectric anisotropy of the liquid crystal molecules. In particular, when a voltage is applied and the field strength thus increases, the liquid crystal molecules are driven with a driving force provided by the electric field acting upon the liquid crystal molecules which have dielectric anisotropy. This response is relatively fast. However, when application of voltage is stopped and the field strength thus decreases, the movement of the liquid crystal molecules is caused only by the restoring force of the elastic liquid crystal molecules (since no driving force is provided by the electric field). As a result, the response speed when the field strength decreases is considerably lower than that when the field strength increases, whereby the total response speed of the liquid crystal display device is relatively low.

As described above, there is a need for a transverse electric field type liquid crystal display device with the pixel size and driving voltage being in a practical range, and having a high aperture ratio, a high contrast (i.e., a high transmission), and a high response speed.

SUMMARY OF THE INVENTION

According to one aspect of this invention, a liquid crystal display device includes: a pair of substrates; a liquid crystal layer provided between the substrates; and a transverse electric field generating electrode capable of being driven in a matrix driving manner which is provided on at least one of the pair of substrates and is connected to external control means. Each of the pair of substrates is provided with alignment means for aligning liquid crystal molecules in the liquid crystal layer so that the liquid crystal layer has spontaneous polarization generally parallel to a surface of the substrate.

In one embodiment of the invention, the liquid crystal material contained in the liquid crystal layer is a nematic liquid crystal material.

In another embodiment of the invention, the liquid crystal material contained in the liquid crystal layer has a banana-like or conical molecular shape including at least two rodlike portions derived from a rodlike compound, at least one of which exhibits liquid crystallinity, and a linking portion derived from a compound selected from an alcohol compound, a ring compound and a nonlinear compound.

In still another embodiment of the invention, the linking portion is derived from a compound having a dipole moment.

In still another embodiment of the invention, the liquid crystal material contained in the liquid crystal layer has a molecular shape selected from a banana shape, a cone shape and a wedge shape.

In still another embodiment of the invention, the means for driving the transverse electric field generating electrode is active matrix driving means using an active element.

In still another embodiment of the invention, the transverse electric field generating electrode substantially extends from one of the pair of substrates to the other substrate.

In still another embodiment of the invention, the alignment means is an alignment film for which a predetermined alignment treatment is performed.

In still another embodiment of the invention, the predetermined alignment treatment is a rubbing treatment.

In still another embodiment of the invention, the liquid crystal molecules in the liquid crystal layer are oriented in a spray orientation or in a bend orientation.

Thus, the invention described herein makes possible the advantages of: (1) providing a transverse electric field type liquid crystal display device having a high aperture ratio; (2) providing a transverse electric field type liquid crystal display device having a high contrast (i.e., a high transmission); and (3) providing a transverse electric field type liquid crystal display device having a high response speed.

These and other advantages of the present invention will become apparent to those skilled in the art upon reading and understanding the following detailed description with reference to the accompanying figures.

DESCRIPTION OF THE PREFERRED EMBODIMENTS

In the present specification, the term "a rodlike compound" is meant to include a compound having a rigid rodlike molecular structure.

The term "a ring compound" is meant to include a compound having a ring structure (e.g., substituted or non-substituted aromatic ring, substituted or non-substituted alicyclic ring, or heterocyclic ring).

The term "a nonlinear compound" is meant to include a compound having a nonlinear molecular shape.

The term "an alcohol compound" is meant to include a monohydric alcohol and a polyhydric alcohol.

Figure 1A:
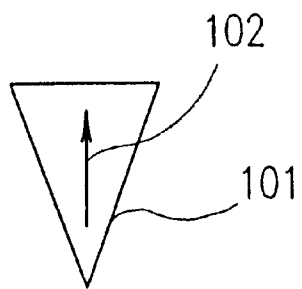
FIGS. 1A and 1B are schematic diagrams illustrating means for generating spontaneous polarization in a liquid crystal layer containing cone-shaped liquid crystal molecules in a liquid crystal display device of the present invention.
Figure 1B:
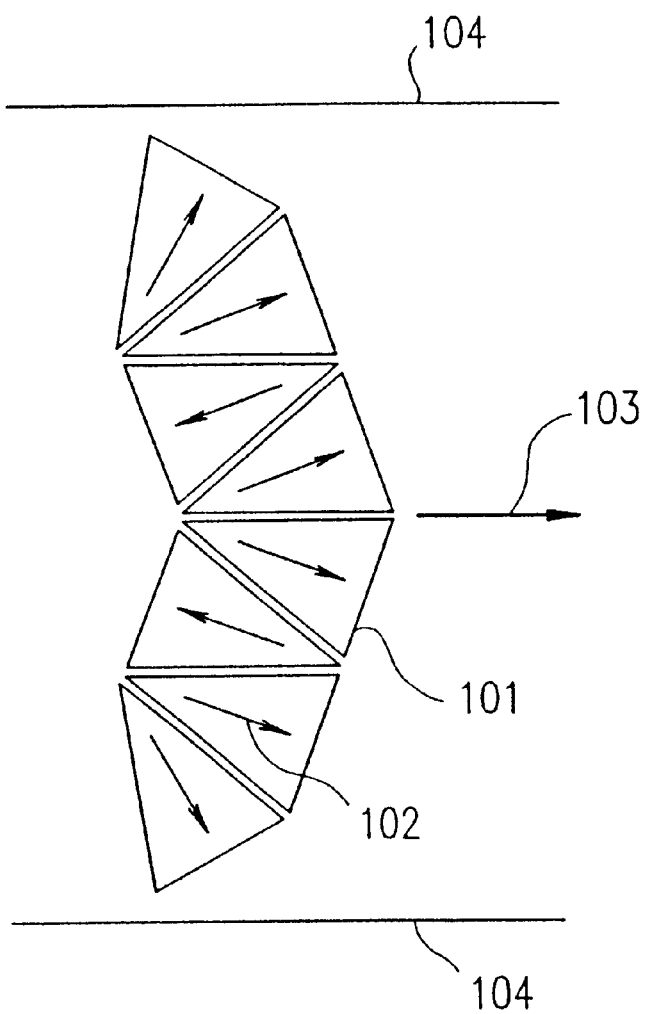

A. Driving Principle of Liquid Crystal Molecules According to the Present Invention A-1. Liquid crystal material and alignment means:

FIGS. 1A and 1B are schematic diagrams illustrating means for generating spontaneous polarization in a liquid crystal layer in a liquid crystal display device of the present invention. FIG. 1A is a schematic diagram illustrating a molecular shape of a liquid crystal material employed in the present invention; and FIG. 1B is a schematic diagram illustrating the orientation of liquid crystal molecules in a liquid crystal layer caused by a predetermined alignment treatment in the absence of an applied voltage.

A liquid crystal material used in the present invention is a liquid crystal material (preferably, a nematic liquid crystal material) which can, as a whole liquid crystal layer, generate spontaneous polarization by a predetermined alignment treatment in the absence of an applied voltage. The type of the nematic liquid crystal material may be either the n-type or the p-type. Preferably, such a liquid crystal material has a conical, wedge-like, or banana-like molecular shape. For example, in the case of a liquid crystal material having a conical molecular shape, a liquid crystal molecule 101 thereof has a permanent dipole moment in a direction as denoted by the arrow 102, as shown in FIG. 1A.

Such a liquid crystal material can be synthesized by condensing together at least two rodlike compounds (compounds each having a generally rodlike molecular shape). At least one of the rodlike compounds is a compound which exhibits liquid crystallinity (e.g., the compounds shown in Table 1).

TABLE 1

Rodlike compounds

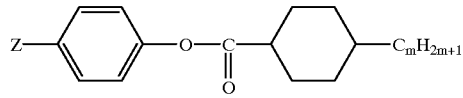

TABLE 1-continued

Rodlike compounds

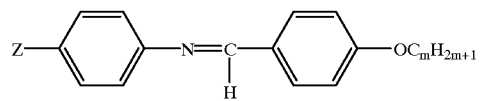

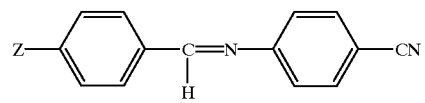

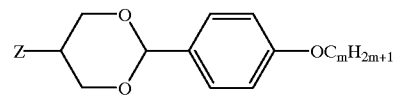

In the table, m is an integer of one or greater; and Z may be any suitable substituent (e.g., H, OH, COOH) as long as the advantages of the present invention are not compromised.

For example, the liquid crystal material represented by Formula 3 may be obtained by condensing a Schiff-type compound (Formula 1) having a carboxyl group which is a rodlike compound exhibiting liquid crystallinity with an alcohol compound (Formula 2). In Formula 2, n is an odd number, and preferably is 1 and 3 (in the illustrated case, n is 3). Such a liquid crystal material has a banana-like or conical molecular shape (note that Formula 3 represents a liquid crystal material having a banana-like molecular shape) including at least two rodlike portions derived from a rodlike compound and a linking portion derived from an alcohol compound. The condensation may be performed under any suitable condition as long as the advantages of the present invention are not compromised (for example, the liquid crystal material represented by Formula 3 may be obtained by reacting the compound represented by Formula 1 with the compound represented by Formula 2 (where n is 3)).

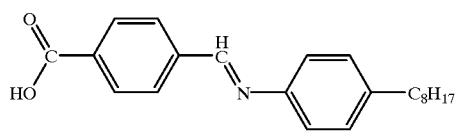

Formula 1

Formula 2

Formula 3

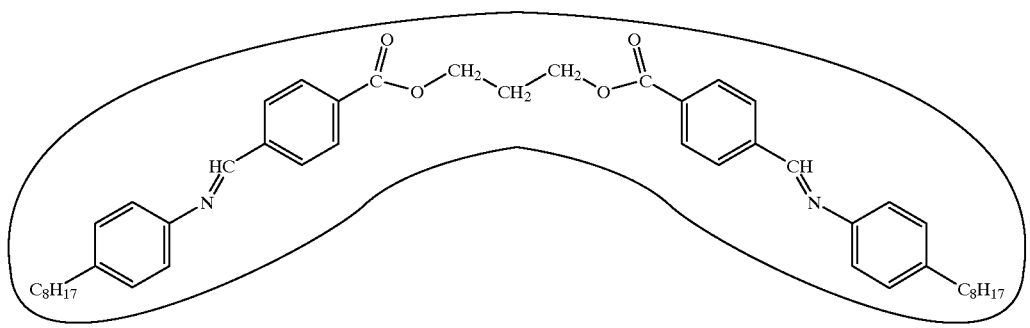

Alternatively, the above-described liquid crystal material may be synthesized by reacting at least two rodlike compounds with a ring compound or a nonlinear compound. Specific examples of the ring compound may include those listed in Tables 2 to 4. Specific examples of the nonlinear compound may include those listed in Table 5. For example, two rodlike compounds may be bound to one of the ring compounds listed in Tables 2 to 4 by reacting with the substituent $R_1$ and $R_2$, respectively. Alternatively, two rodlike compounds may be bound to one of the nonlinear compounds listed in Tables 5 by reacting with the substituent $R_3$ and $R_4$, respectively. Thus, these rodlike compounds may be bound to the listed compound at the positions such that their molecular long axes form a certain angle with respect to each other. The substituent $R_1$ and $R_2$ of the ring compound may include H, OH, COOH. The substituent $R_3$ and $R_4$ of the nonlinear compound may include H, a substituted or non-substituted alkyl group. The substituted Z of the rodlike compound may include H, OH, COOH. As in the above-described case, at least one of the rodlike compounds is a compound which exhibits liquid crystallinity (e.g., one of the compounds listed in Table 1). Such a liquid crystal material has a banana-like or conical molecular shape including at least two rodlike portions derived from a rodlike compound and a linking portion derived from a ring compound or a nonlinear compound. For example, the banana-shaped liquid crystal material represented by Formula 6 may be obtained by condensing a Schiff-type compound (Formula 1) having a carboxyl group which is a rodlike compound exhibiting liquid crystallinity with an alcohol-type ring compound (Formula 5). Alternatively, the banana-shaped liquid crystal material represented by Formula 8 may be obtained by substituting ethylene with a rodlike compound having a structure similar to that represented by Formula 1. The rodlike compound may be directly bound to the ring or nonlinear compound, or may be bound thereto via flexible linear moiety (e.g., $—(CH_2)_p—$, $—(CH_2)_p—O—(CH_2)_q—$ where p is an integer of one or greater and q is an integer of zero or greater).

TABLE 2

Ring compounds

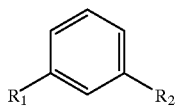

TABLE 2-continued

Ring compounds

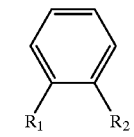

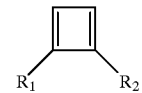

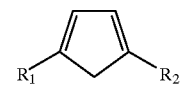

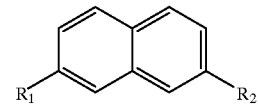

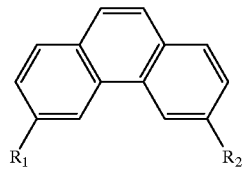

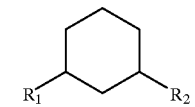

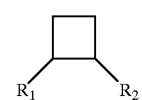

TABLE 2-continued
Ring compounds
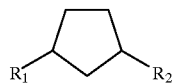
TABLE 3
Ring compounds
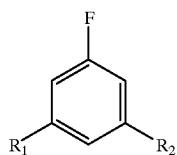
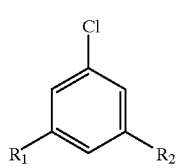
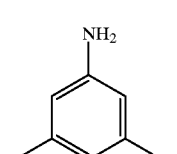
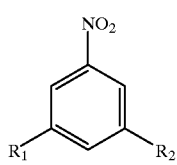
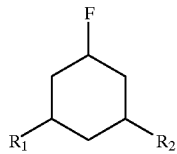
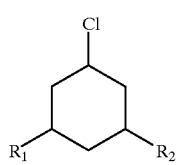
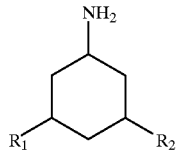
TABLE 3-continued
Ring compounds
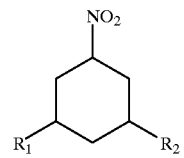
TABLE 4
Ring compounds
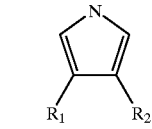
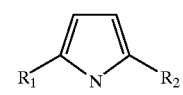
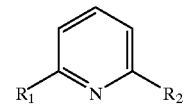
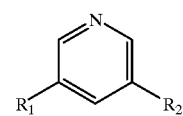
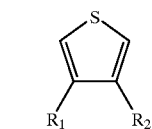
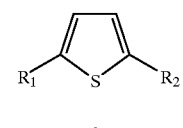
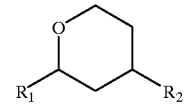
TABLE 5
Nonlinear compounds
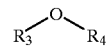
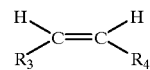

TABLE 5-continued
Nonlinear compounds
Using an appropriate ring or nonlinear compound, the cone-shaped or wedge-shaped liquid crystal material may be obtained in the same manner as the banana-shaped liquid crystal material. Examples of such ring or nonlinear compound may include the following compounds.
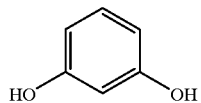
Formula 5
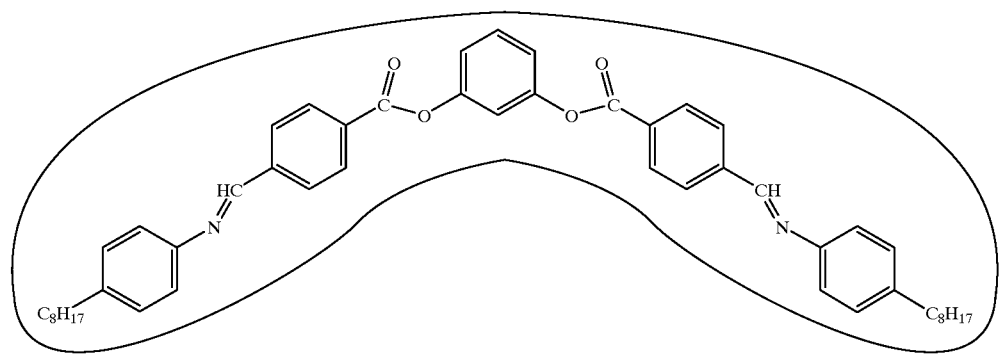
Formula 6
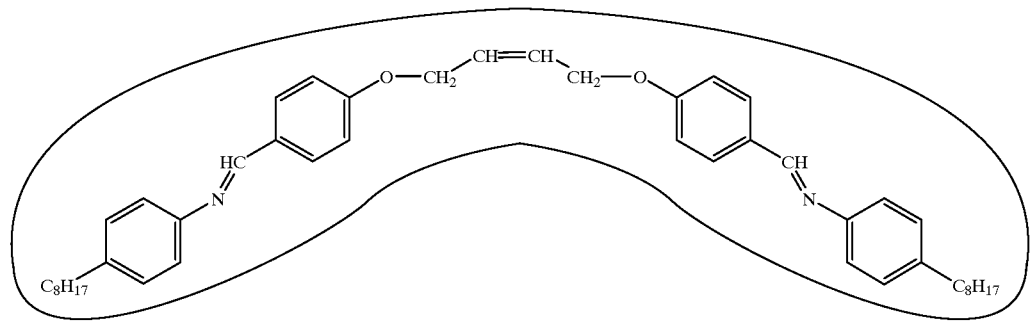
Formula 8
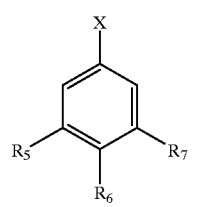 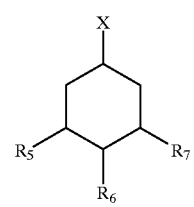 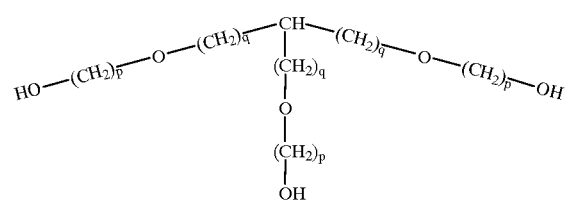

-continued

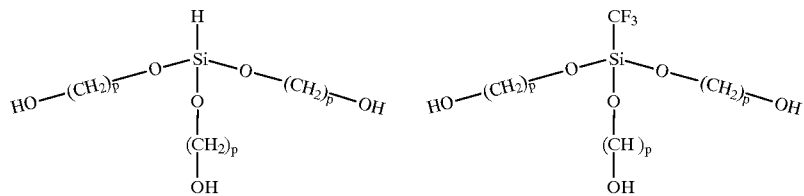

The substituent X may include H, F, Cl, $NH_2$, and $NO_2$. The substituent $R_5$, $R_6$ and $R_7$ may include H, OH, COOH. p is an integer of one or greater. q is an integer of zero or greater. For example, the cone-shaped liquid crystal material represented by Formula 10, 11 or 12 may be obtained by reacting three rodlike compounds represented by Formula 1 with any one of the above-mentioned compounds. Any suitable reaction condition may be employed for producing the cone-shaped or wedge-shaped liquid crystal material.

Formula 10

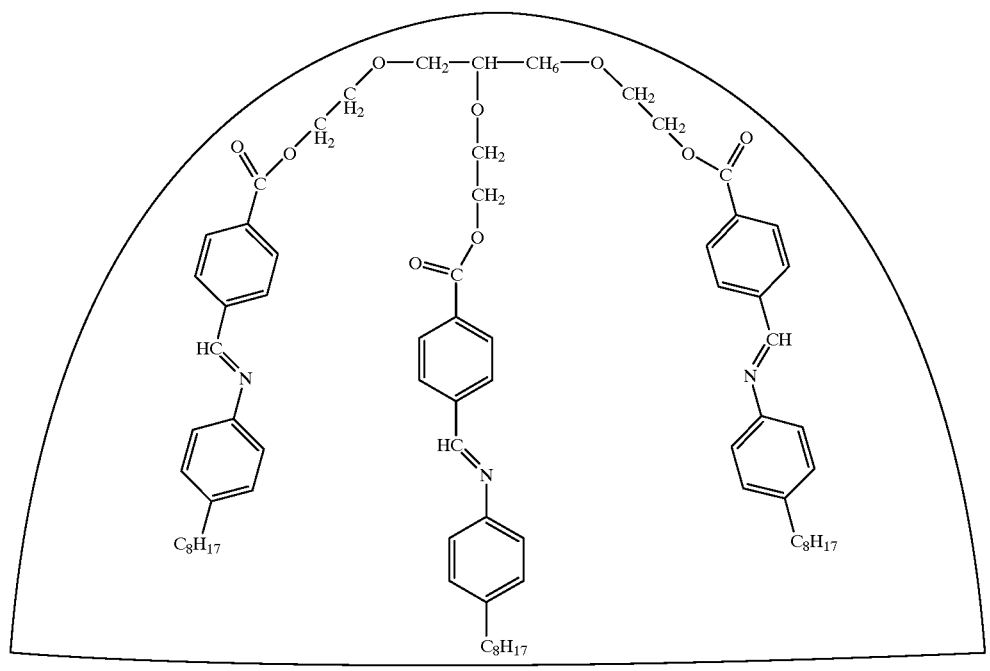

-continued

Formula 11

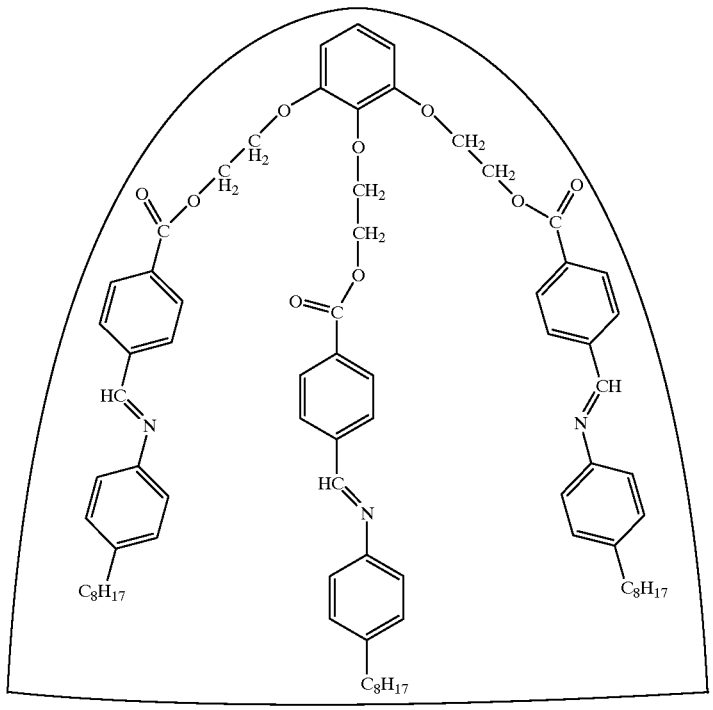

Formula 12

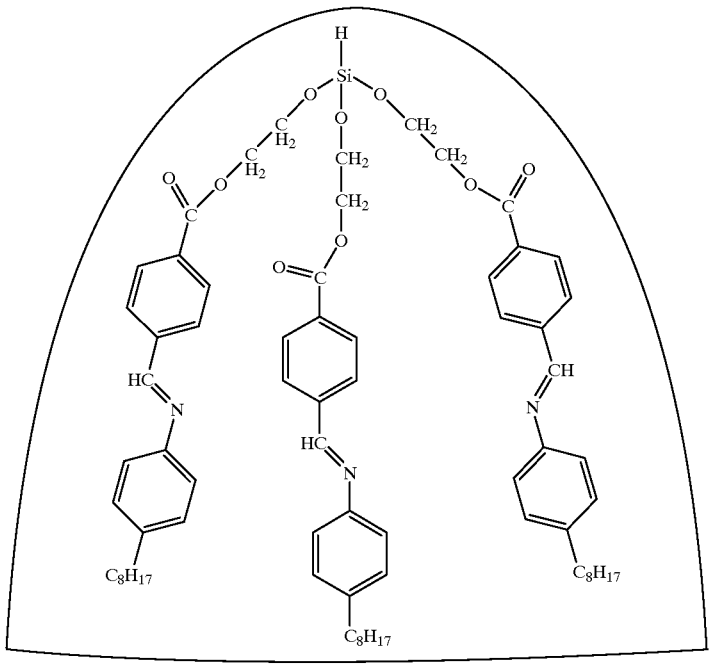

Preferably, each of the ring compound and the nonlinear compound is a compound having a dipole moment. Such a compound having a dipole moment may include, for example, a ring compound having an electron-withdrawing substituent such as those listed in Table 3, a heterocyclic compound such as those listed in Table 4, or a nonlinear compound such as the ketone listed in Table 5 (on the right). With the use of such a ring or nonlinear compound having a dipole moment, the permanent dipole moment of the resultant banana-shaped or cone-shaped (or wedge-shaped) liquid crystal material can be increased. Specific examples of such a liquid crystal material may include the banana-shaped liquid crystal material represented by Formula 7 or 9, and a cone-shaped liquid crystal material represented by Formula 13 or 14.

Formula 7
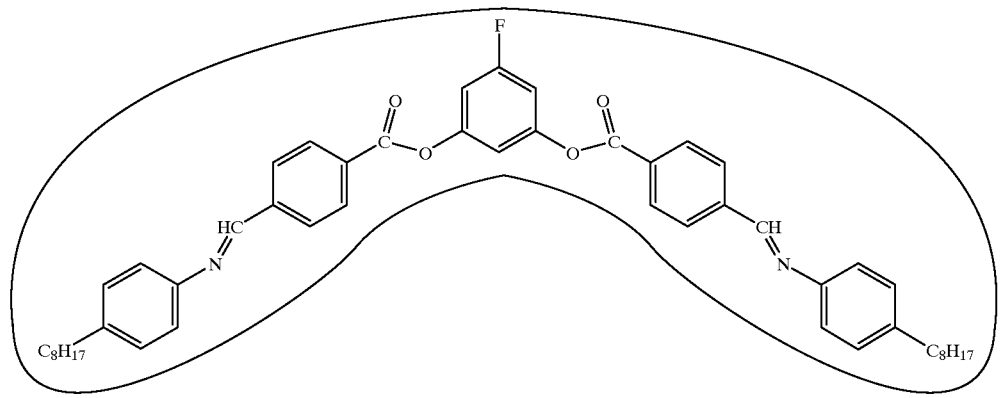
Formula 9
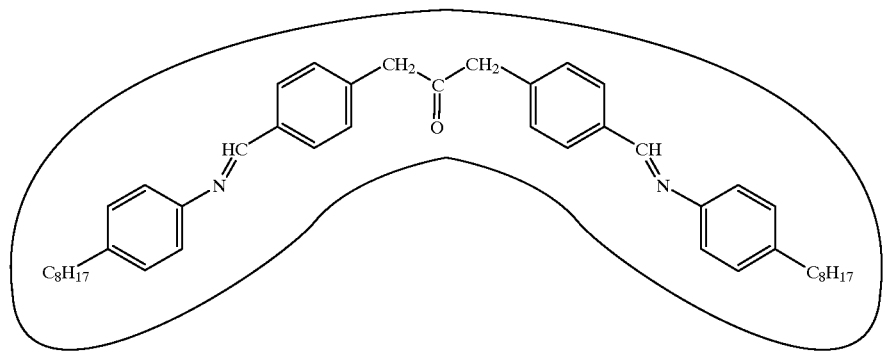
Formula 13
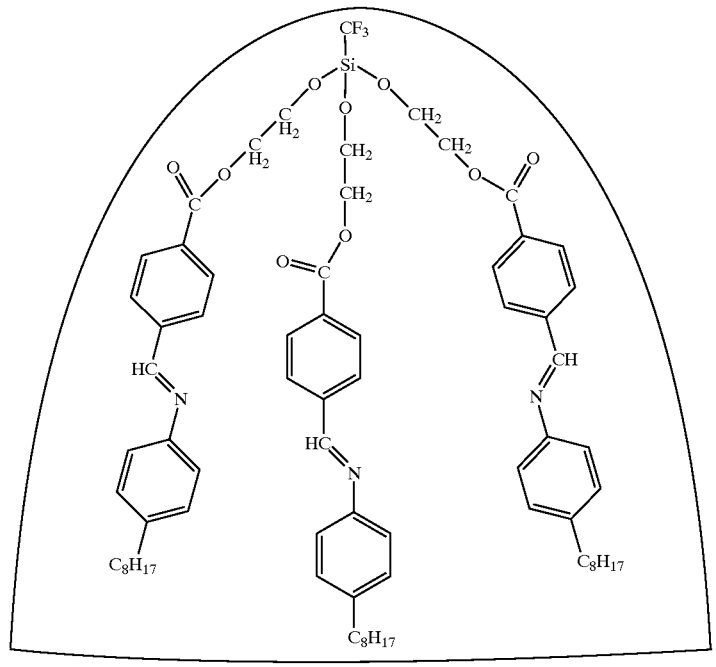

-continued

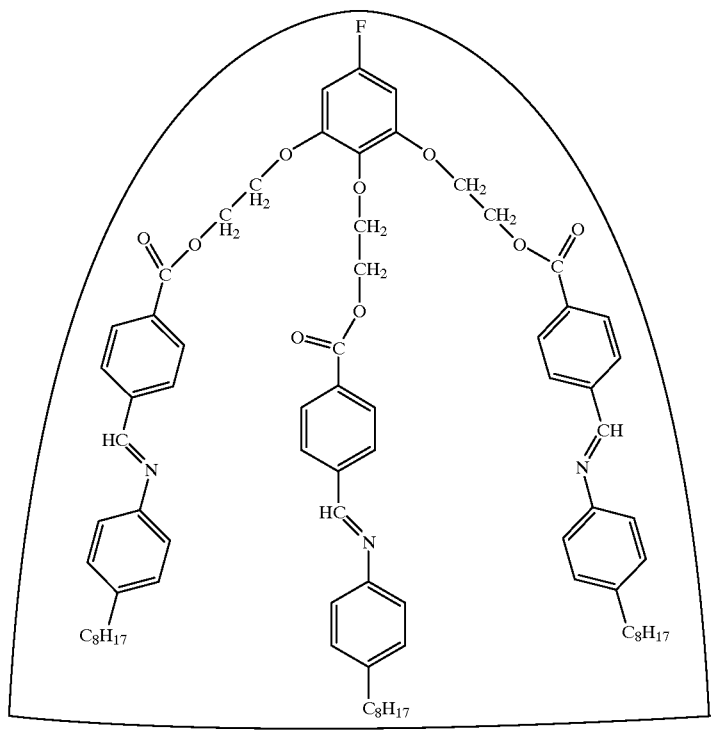

Formula 14

Such a liquid crystal material may be mixed with any suitable additive to be used as a liquid crystal composition for a display medium.

When the liquid crystal layer containing such a liquid crystal material is disposed between substrates 104 and 104 each provided with an alignment means for aligning liquid crystal molecules in a liquid crystal layer, the molecules 101 of the liquid crystal material (liquid crystal molecules) contained in the liquid crystal layer are aligned. The alignment means for aligning the liquid crystal molecules in the liquid crystal layer is typically an alignment film for which a predetermined alignment treatment is performed. The alignment treatment is performed so that the liquid crystal layer has spontaneous polarization in a direction generally parallel to the substrate surface in the absence of an applied voltage. In the present invention, any suitable alignment treatment may be employed as long as the liquid crystal layer has spontaneous polarization in a direction generally parallel to the substrate surface in the absence of an applied voltage. A typical alignment treatment may include the rubbing treatment. A typical orientation thus obtained may include the spray orientation, or the bend orientation. The alignment film for which an alignment treatment is performed may be formed by using any suitable alignment film material. The pretilt angle of the liquid crystal molecules may be adjusted by appropriately selecting the material of the alignment film. Any suitable thickness (e.g., 5 to 5000 nm) may be employed for the alignment film. As described above, according to the present invention, a predetermined orientation of the liquid crystal molecules can be achieved by appropriately combining a predetermined liquid crystal material and a predetermined alignment treatment.

For example, when a liquid crystal material has a conical molecular shape, as shown in FIG. 1A, the liquid crystal molecules 101 may be oriented as shown in FIG. 1B by performing a spray alignment treatment for the substrate (i.e., the alignment film). Since the individual liquid crystal molecules 101 are arranged with a certain regularity, there is also a certain regularity in the direction of the permanent dipole moment 102 of the individual liquid crystal molecules 101. As a result, in the absence of an applied voltage, the liquid crystal layer has spontaneous polarization in a direction parallel to the substrate surface, as denoted by the arrow 103. In this situation, the permanent dipole moment 102 of each liquid crystal molecule 101 has at least a component parallel to the substrate surface.

According to the present invention, a transverse electric field acts upon the spontaneously-polarized liquid crystal layer. That is, the driving mode (display mode) of the liquid crystal molecules of the present invention is essentially different from that of a conventional technique where a transverse electric field is effected using dielectric anisotropy of the liquid crystal material.

A-2. Driving principle of liquid crystal display device of the present invention:

Hereinafter, the driving principle of a liquid crystal display device of the present invention will be described in detail.

Figure 2A:
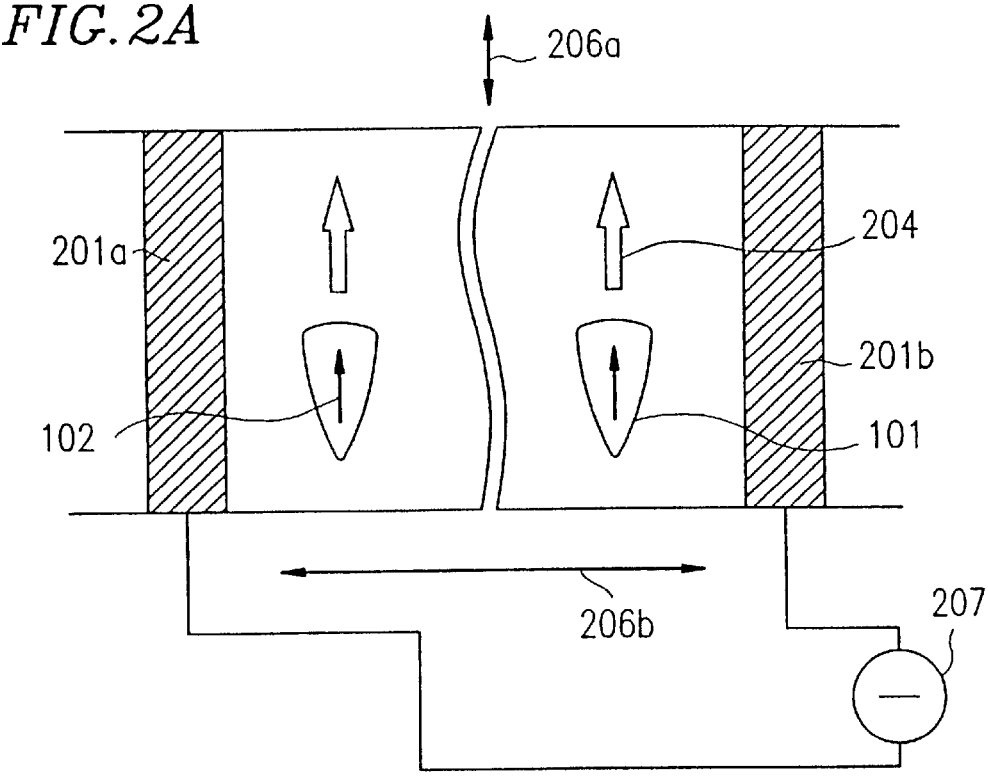
FIGS. 2A and 2B are schematic diagrams illustrating a driving principle of liquid crystal molecules according to a preferred embodiment of the present invention.
Figure 2B:
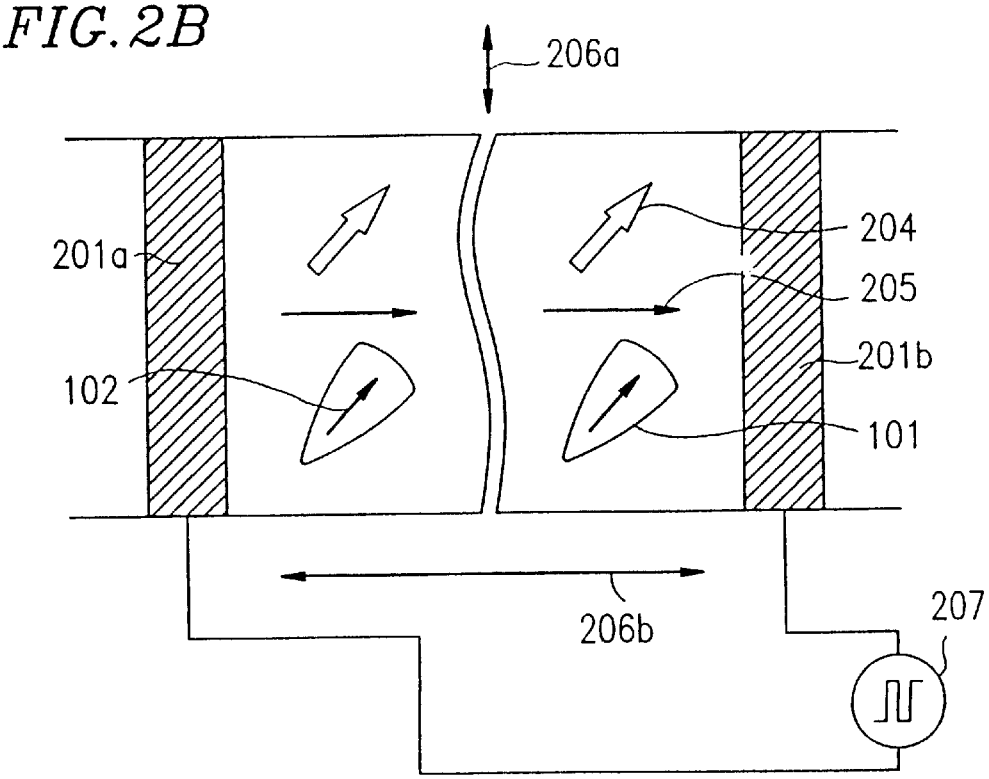

FIGS. 2A and 2B are schematic diagrams illustrating the driving principle of liquid crystal molecules according to a preferred embodiment of the present invention. FIG. 2A is a plan view illustrating the liquid crystal display device of the present invention in the absence of an applied voltage; and FIG. 2B is a plan view illustrating the liquid crystal display device of the present invention in the presence of an applied voltage.

As shown in FIGS. 2A and 2B, transverse electric field generating electrodes 201a and 201b are provided on one substrate with a predetermined interval therebetween. Upper and lower polarizers are provided on the upper and lower substrates, respectively. In view of the refractive index anisotropy of the liquid crystal layer, a polarization axis (absorption axis) of the upper polarizer is set in the direction denoted by 206a, while a polarization axis (absorption axis) of the lower polarizer is set in the direction denoted by 206b. The direction of spontaneous polarization of the liquid crystal layer is set in the direction denoted by the arrow 204 by performing a predetermined alignment treatment for the substrate.

As shown in FIG. 2A, in the absence of an applied voltage, linearly-polarized light which has passed through the lower polarizer passes through the liquid crystal layer while maintaining its linear polarization and without rotating the polarization axis thereof, and then reaches the upper polarizer, where it is completely blocked.

On the other hand, as shown in FIG. 2B, when a voltage is applied between the electrodes 201a and 201b by a power source 207, a transverse electric field is generated, as denoted by the arrow 205. The transverse electric field 205 acts upon spontaneous polarization of the liquid crystal layer so as to rotate the liquid crystal molecules 101. As a result, refractive index anisotropy is generated in the liquid crystal layer so as to change the linearly-polarized light which has passed through the lower polarizer into elliptically-polarized light, or otherwise to rotate the polarization axis thereof. Thus, light which has passed through the liquid crystal layer can pass through the upper polarizer.

The present invention utilizes a novel driving principle of liquid crystal molecules, and makes it possible to realize a transverse electric field type liquid crystal display device which has a high aperture ratio and a high contrast (i.e., a high transmission). The reason therefor will be described below.

Unlike the conventional liquid crystal display device, the present invention uses a predetermined liquid crystal material and performs a predetermined alignment treatment, whereby the liquid crystal layer has spontaneous polarization. Therefore, both when a voltage is applied and the field strength thus increases and when application of voltage is stopped and the field strength thus decreases, the liquid crystal molecules are driven with a driving force provided by the interaction between spontaneous polarization and an electric field. As a result, the response speed when the field strength decreases and that when the field strength increases are comparable to each other, whereby the response speed of the liquid crystal display device as a whole is increased. Particularly, the response speed when application of voltage is stopped is remarkably increased.

Moreover, according to the present invention, spontaneous polarization of the liquid crystal layer can be further increased by appropriately varying the type of liquid crystal material and the type of alignment treatment. As a result, the driving voltage can be reduced, whereby the additional electrode in a pixel required in the conventional technique is no longer necessary. Thus, a liquid crystal display device having a high aperture ratio can be obtained.

Moreover, according to the present invention, the alignment treatment needs to be performed for the liquid crystal layer to have spontaneous polarization. Unlike the transverse electric field type liquid crystal display device, it is not necessary for the rubbing directions for the respective upper and lower substrates to be identical to each other, nor is it necessary to precisely adjust the rubbing direction to the polarization axis of the polarizer. Therefore, according to the present invention, a transverse electric field type liquid crystal display device having a high contrast can be produced with a high productivity.

Next, the bend orientation of the banana-shaped liquid crystal molecules will be described. Herein, the liquid crystal molecules are basically driven in the same manner as when driving the cone-shaped liquid crystal molecules, but the resultant arrangement of the liquid crystal molecules is slightly different.

Figure 3:
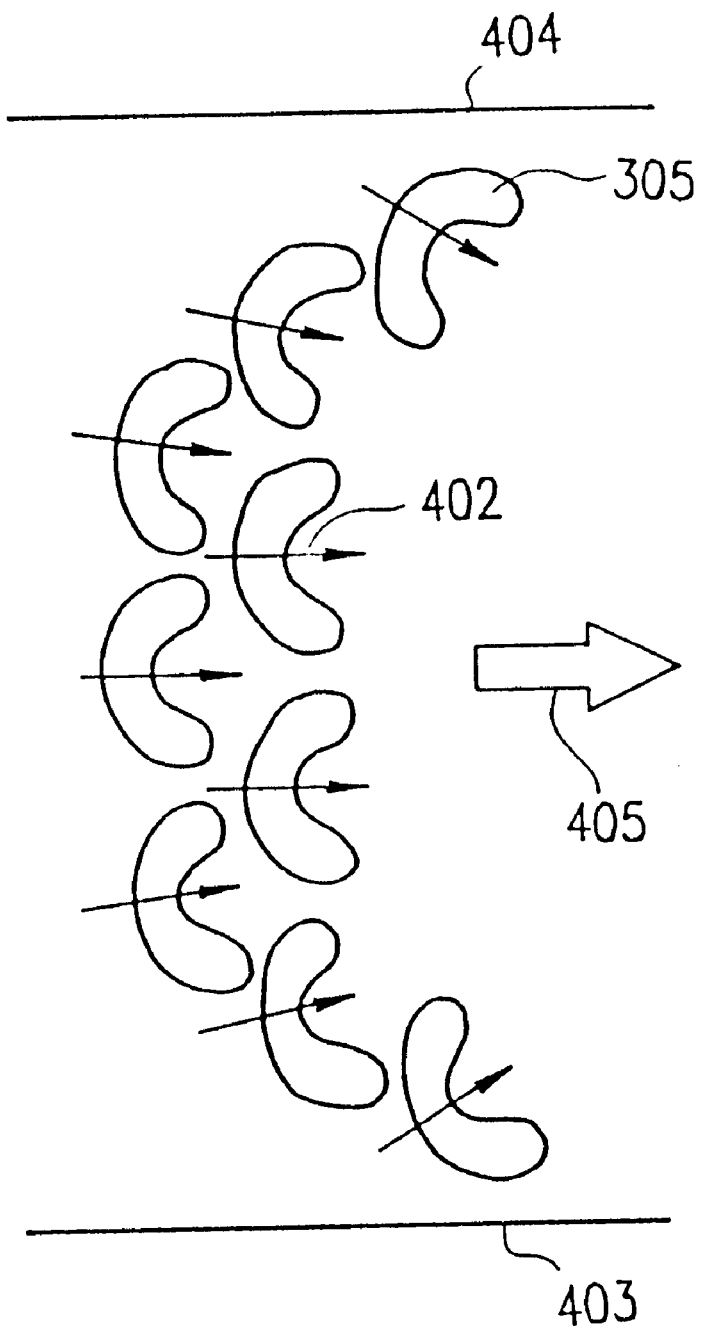
FIG. 3 is a schematic diagram illustrating means for generating spontaneous polarization in a liquid crystal layer containing banana-shaped liquid crystal molecules in a liquid crystal display device of the present invention.

FIG. 3 is a schematic diagram illustrating means for generating spontaneous polarization in a liquid crystal layer containing banana-shaped liquid crystal molecules in a liquid crystal display device of the present invention. In the figure, reference numerals 403 and 404 each denote a substrate for which an alignment treatment is performed so that the liquid crystal molecules are oriented in a bend orientation; and 402 denotes a permanent dipole moment of the liquid crystal molecules. As shown in FIG. 3, when the banana-shaped liquid crystal molecules are oriented in a bend orientation, the permanent dipole moments 402 have certain directions, whereby the liquid crystal layer as a whole generates spontaneous polarization in the direction denoted by the arrow 405 by the piezoelectric effect. In this situation, the permanent dipole moment 402 of each liquid crystal molecule 305 has at least a component parallel to the substrate surface.

B. Embodiments of Liquid Crystal Display Device of the Present Invention

Embodiment 1

Figure 4:
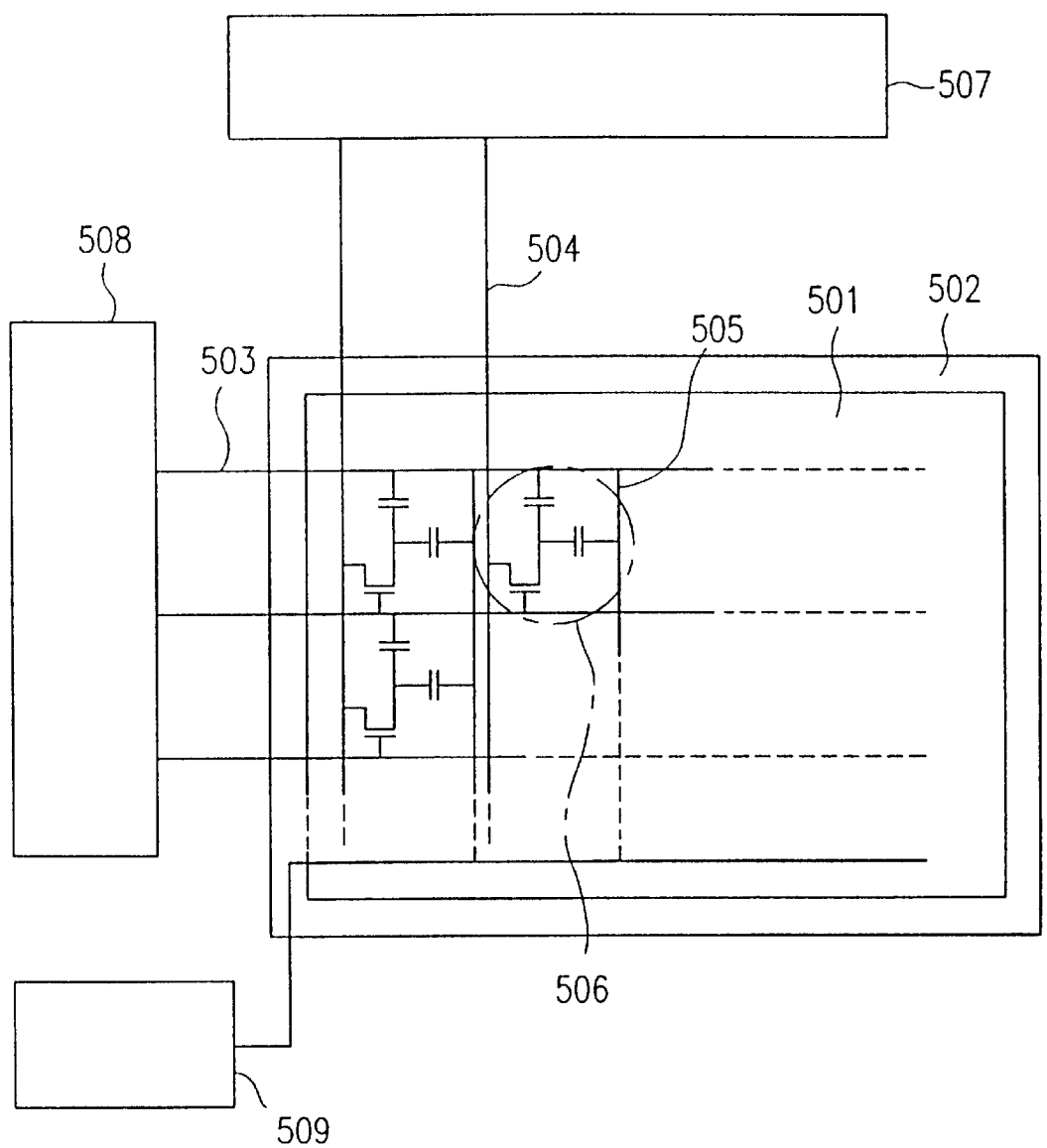
FIG. 4 is a schematic plan view illustrating a liquid crystal display device according to a preferred embodiment of the present invention.
Figure 5:
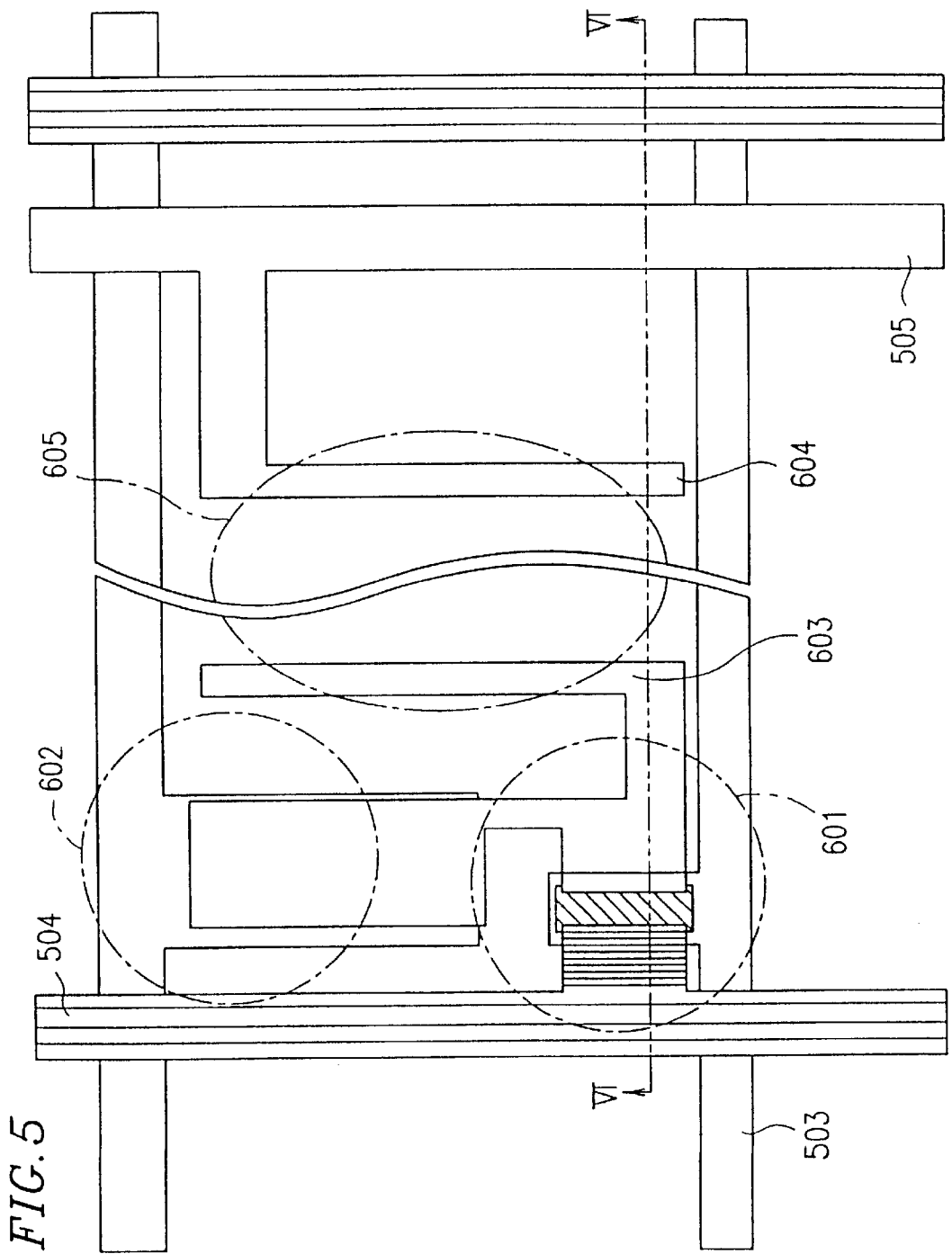
FIG. 5 is a schematic plan view illustrating a one-pixel portion of the liquid crystal display device of FIG. 4.
Figure 6:
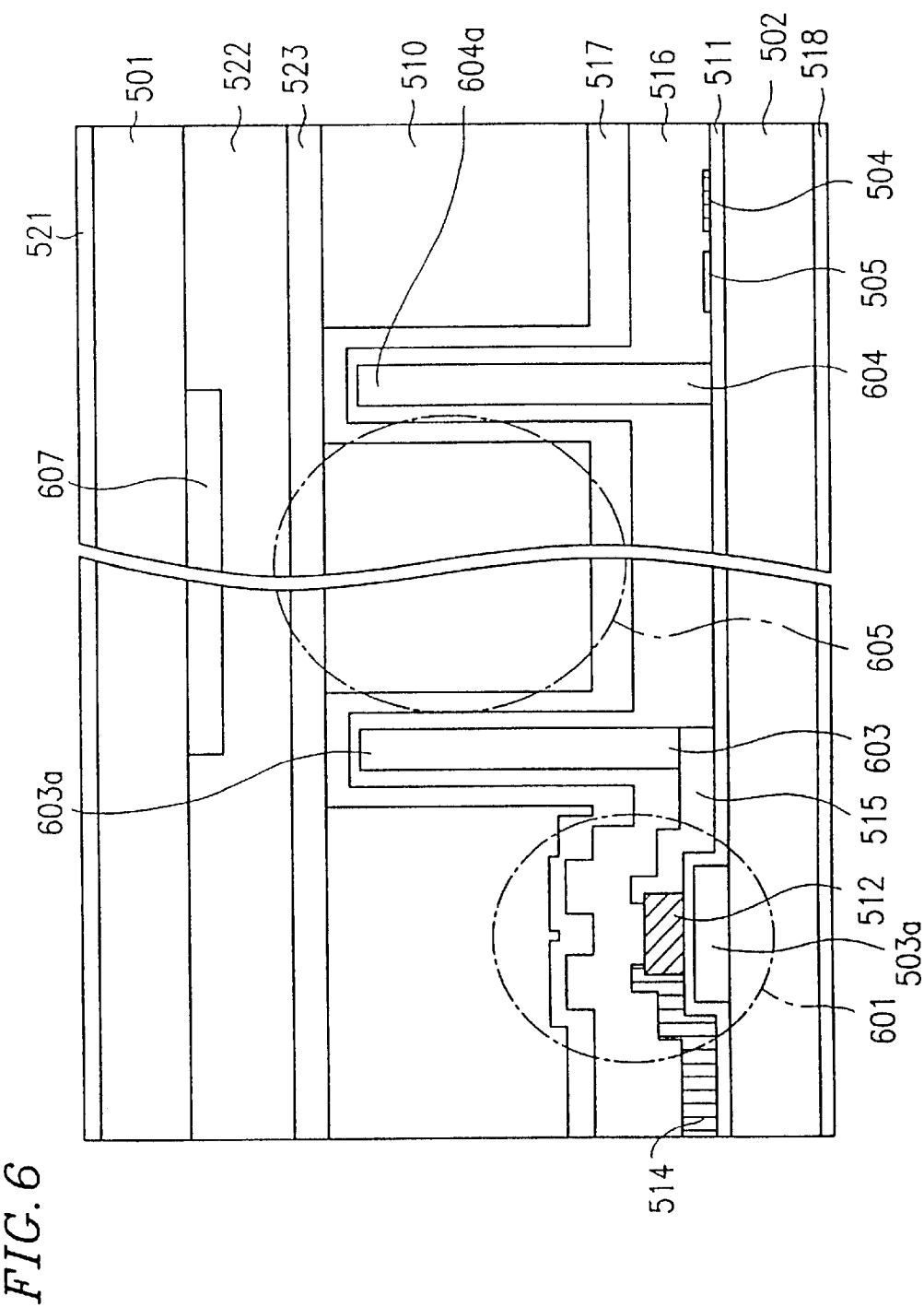
FIG. 6 is a cross-sectional view taken along the line VI—VI in FIG. 5.

Referring to FIGS. 4 to 6, a liquid crystal display device according to a preferred embodiment of the present invention will be described. FIG. 4 is a schematic plan view illustrating the liquid crystal display device; FIG. 5 is a schematic plan view illustrating a one-pixel portion of the liquid crystal display device illustrated in FIG. 4; and FIG. 6 is a cross-sectional view taken along the line VI—VI in FIG. 5.

The liquid crystal display device includes a pair of substrates 501 and 502, and a liquid crystal layer 510 containing an n-type nematic liquid crystal material provided between the substrates. The liquid crystal material to be contained in the liquid crystal layer is one as defined above.

A thin film transistor (TFT) element 601 is provided on the lower substrate 502 on the liquid crystal layer side thereof. The TFT element includes a scanning line 503; a gate electrode 503a branching from the scanning line; an insulating layer 511 covering the substrate on which the scanning lines are formed; a semiconductor layer 512 provided on a portion of the insulating layer 511 over the gate electrode 503a; and a source electrode 514 and a drain electrode 515 formed separated from each other on the semiconductor layer 512.

The source electrode 514 is a branched portion of a signal line 504 formed on the insulating layer 511. Of a pair of transverse electric field electrodes 603 and 604, the electrode 603 is connected to the drain electrode 515. The other electrode 604 is formed on the insulating layer 511, and is connected to a common line 505 which is also formed on the insulating layer 511. Moreover, an insulating film 516 is formed covering the substrate on which these components are formed, and an alignment film 517 is formed on the insulating film 516. Thus, an active matrix substrate is configured. A polarizer 518 is provided on the opposite side of the substrate 502 with respect to the liquid crystal layer 510.

A pixel display section 605, where the liquid crystal layer 510 is driven by applying a transverse electric field across the liquid crystal layer 510, is provided interposed between the transverse electric field electrodes 603 and 604.

A polarizer 521 is provided on the opposite side of the substrate 501 with respect to the liquid crystal layer 510. The substrate 501 is the substrate provided on the opposite side of the liquid crystal layer 510 with respect to the active matrix substrate. A color filter 607 is formed on the substrate 501 on the liquid crystal layer side so as to face the pixel display section 605. A flattening film 522 is formed on the color filter 607. An alignment film 523 is formed on the flattening film 522. An alignment treatment is performed for the alignment films 523 and 517 so that the liquid crystal molecules in the liquid crystal layer 510 are oriented in a predetermined orientation (e.g., the spray orientation, the bend orientation).

The transverse electric field electrodes 603 and 604 extend upward from the substrate 502, with top surfaces 603a and 604a thereof being secured to the alignment film 523 on the substrate 501 via the insulating film 516 and the alignment film 517. Since the transverse electric field electrodes extend to be on the counter substrate via the insulating film 516 and the alignment film 517, the transverse electric field electrodes can function as a spacer as well as the liquid crystal molecules can be satisfactorily driven across the entire depth of the liquid crystal layer. The height of the transverse electric field electrode may be adjusted to any appropriate height. As the height of the transverse electric field electrode is decreased, the production cost of the liquid crystal display device may be reduced accordingly.

Video signals are supplied from a signal driving circuit 507 to the signal lines 504 of the liquid crystal display device. Scanning signals are supplied from a scanning driving circuit 508 to the scanning lines 503. A common voltage is supplied from a common voltage generating circuit 509 to the common lines 505.

The liquid crystal display device according to the present embodiment is a matrix driving type liquid crystal display device which may be produced by any appropriate method.

In the liquid crystal display device which has been actually produced according to the present embodiment, the pixel display section 605 includes 640×400×3 pixels, and has a diagonal line of about 12 inches and a cell gap of about 5 $\mu$m.

Figure 7:
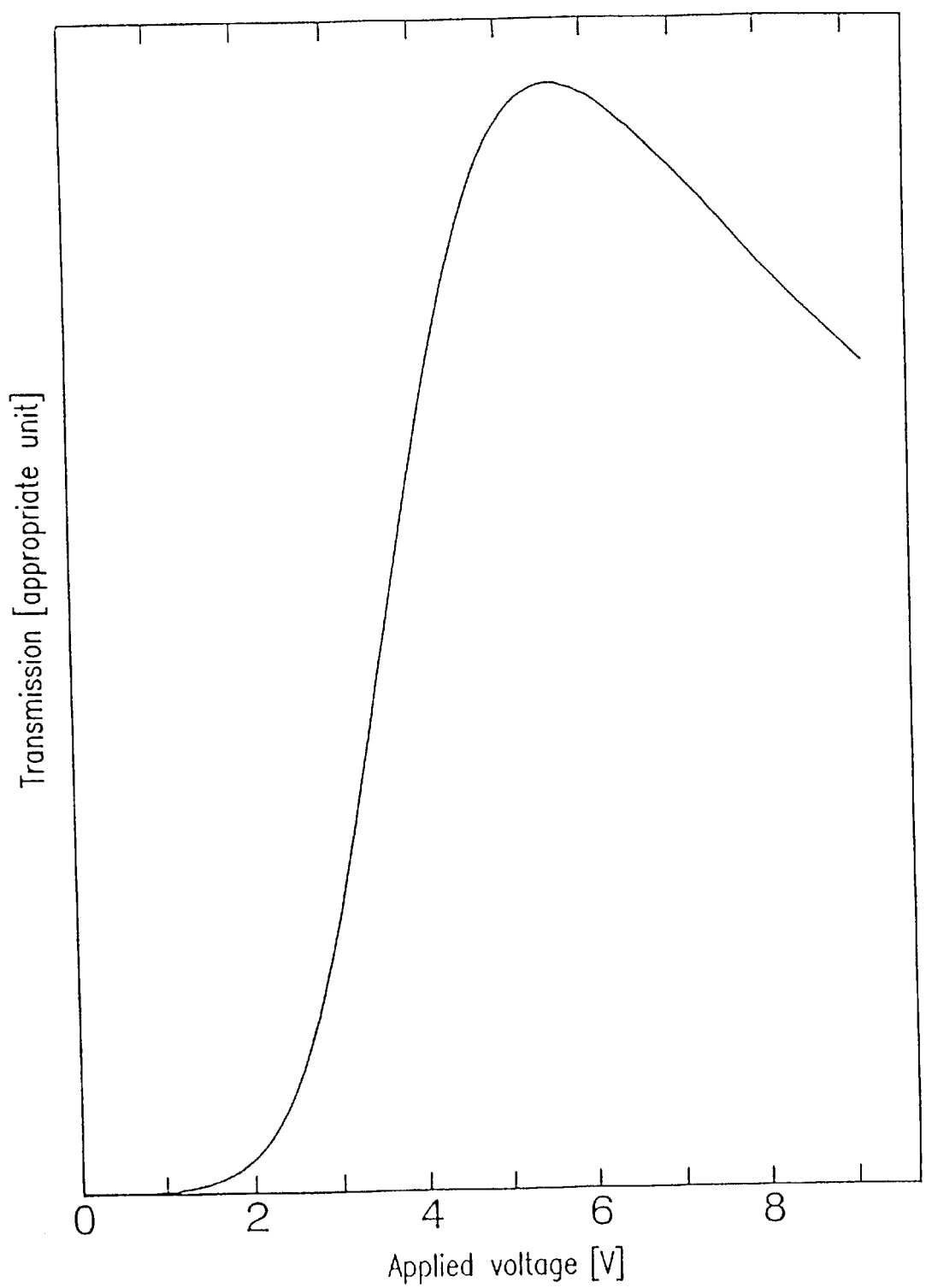
FIG. 7 is a graph showing a voltage-transmission characteristic measured when the same voltage is applied across all pixel display portions of a liquid crystal display device according to the present invention which employs 5CB for the liquid crystal layer.

FIG. 7 is a graph showing the voltage-transmission characteristic measured when a certain voltage is applied across all pixel display portions of a liquid crystal display device according to the present invention which employs 4-cyano-4'-pentylbiphenyl (5CB) for the liquid crystal layer. As is apparent from FIG. 7, the strength of a transverse electric field required to achieve the maximum transmission is about 0.07 V/$\mu$m, which is considerably smaller than the field strength (about 1 V/$\mu$m he conventional transverse electric field type liquid crystal display device. Thus, the driving voltage is only about 5.6 V when only a pair of transverse electric field electrodes are provided within a pixel whose short side is about 80 $\mu$m. As a result, the additional electrode in a pixel required in the conventional technique is no longer needed, thereby increasing the aperture ratio of the liquid crystal display device. Moreover, when the response speed was measured between 5% transmission and 95% transmission, the sum of the response speed when the voltage increases and the response speed when the voltage decreases was about 12 msec. This is a 5-fold increase from that in the conventional technique.

Embodiment 2

A Schiff-type compound (Formula 1) which is a rodlike compound exhibiting liquid crystallinity was condensed with an alcohol compound (Formula 2). The banana-shaped liquid crystal material represented by Formula 3 was obtained when n=3 in Formula 2, and the generally linear liquid crystal material represented by Formula 4 was obtained when n=2 in Formula 2.

Formula 1

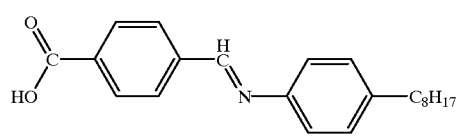

Formula 2

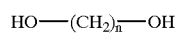

Formula 3

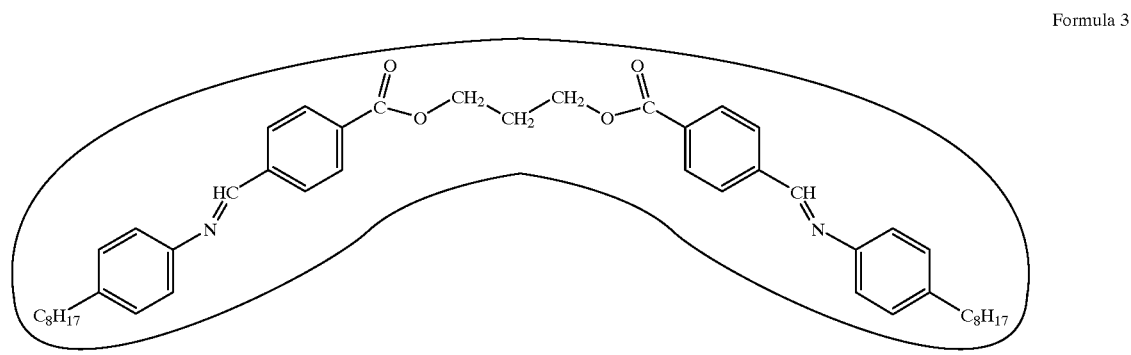

Formula 4

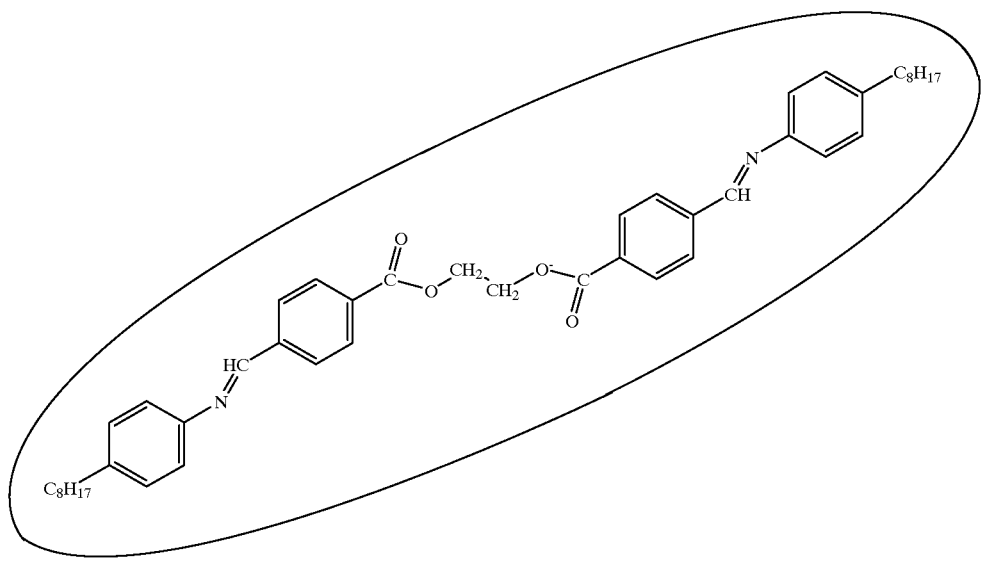

A liquid crystal display device as in Embodiment 1 was produced using the banana-shaped liquid crystal material represented by Formula 3, and the characteristics thereof were examined. As a result, it was possible to substantially increase the light transmission thereof at a low voltage. Thus, a liquid crystal display device having a high aperture ratio was obtained. Moreover, it was possible to increase the response speed of the liquid crystal display device.

On the other hand, with a liquid crystal display device using the compound represented by Formula 4, a liquid crystal display device having such desirable characteristics was not obtained.

Embodiment 3

A Schiff-type compound (Formula 1) having a carboxyl group which is a rodlike compound exhibiting liquid crystallinity was condensed with an alcohol-type ring compound (dihydroxybenzene, Formula 5) under an appropriate condition so as to obtain the banana-shaped liquid crystal material represented by Formula 6.

Formula 1

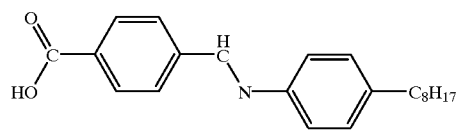

Formula 5

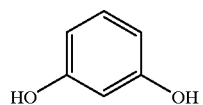

Formula 6

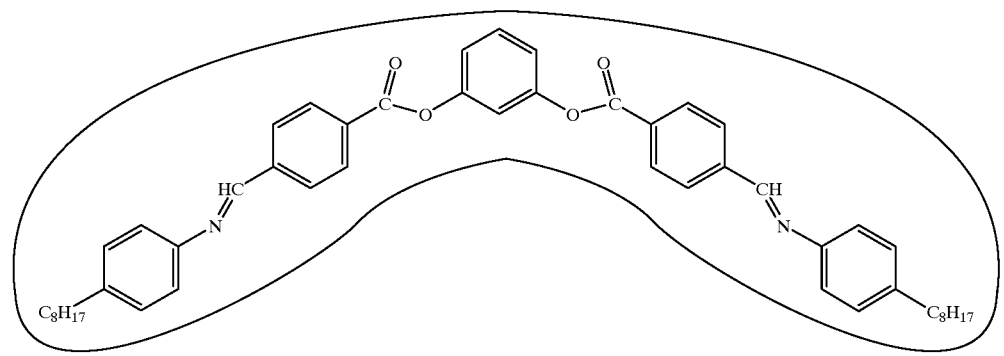

A liquid crystal display device as in Embodiment 1 was produced using the banana-shaped liquid crystal material represented by Formula 6, and the characteristics thereof were examined. As a result, it was possible to sufficiently increase the transmission thereof at a low voltage. Thus, a liquid crystal display device having a high aperture ratio was obtained. Moreover, it was possible to increase the response speed of the liquid crystal display device.

Moreover, a liquid crystal display device having similarly desirable characteristics is obtained when each of the ring compounds listed in Table 2 (e.g., compounds where $R_1$ is OH and $R_2$ is OH) is used instead of dihydroxybenzene represented by Formula 5.

Embodiment 4

A Schiff-type compound (Formula 1) having a carboxyl group which is a rodlike compound exhibiting liquid crystallinity was condensed with a compound having a fluorine-substituted phenyl group under a suitable condition so as to obtain the banana-shaped liquid crystal material represented by Formula 7.

liquid crystal material molecule represented by Formula 7 is greater than that of the liquid crystal material molecule represented by Formula 6.

A liquid crystal display device as in Embodiment 3 was produced using the liquid crystal material represented by Formula 7, and the characteristics thereof were examined. As a result, it was possible to substantially increase the transmission thereof at a voltage even lower than that in the liquid crystal display device according to Embodiment 3 (the liquid crystal display device using the liquid crystal material represented by Formula 6). Thus, a liquid crystal display device having a high aperture ratio was obtained. Moreover, it was also possible to increase the response speed of the liquid crystal display device. Furthermore, since an additional electrode in a pixel is no longer needed, the designing of the driving circuit was facilitated while it was also possible to reduce the power consumption of the liquid crystal display device.

Formula 7

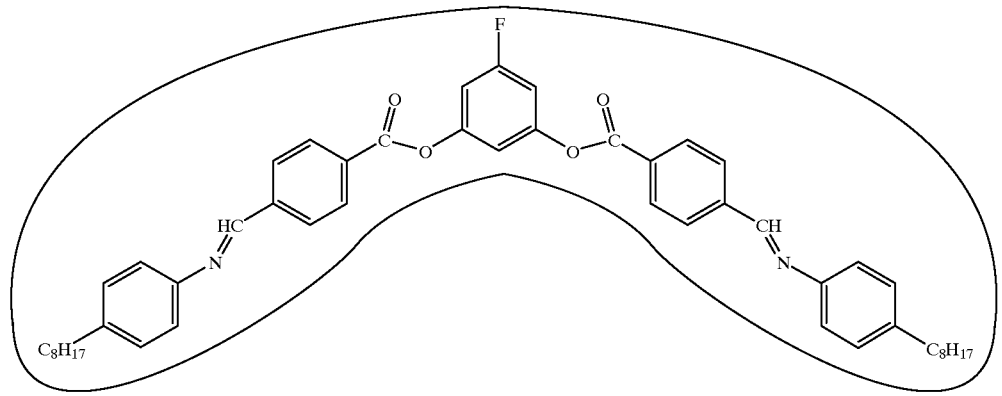

The liquid crystal material represented by Formula 7 had a permanent dipole moment greater than that of the liquid crystal material represented by Formula 6. The reason therefor will be described below with reference to FIGS. 8A, 8B, 9A and 9B.

Figure 8A:
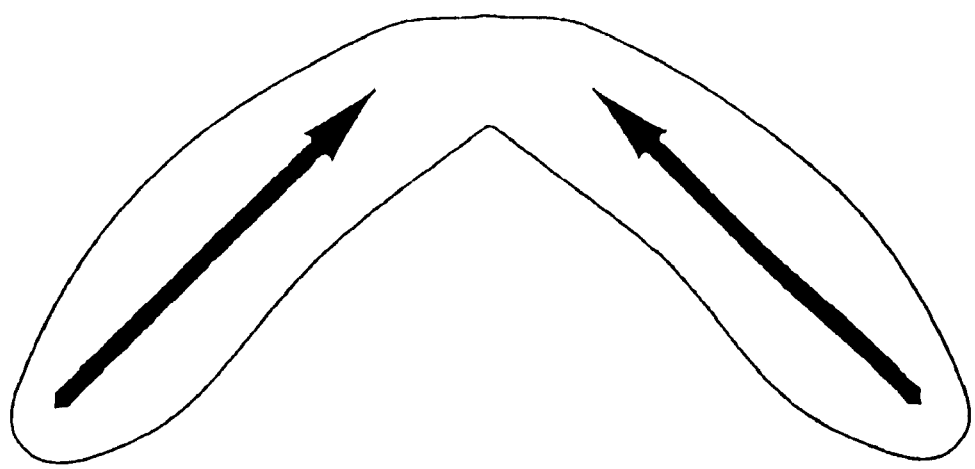
FIGS. 8A and 8B are schematic diagrams illustrating permanent dipole moment of a liquid crystal material according to an embodiment of the present invention.
Figure 8B:
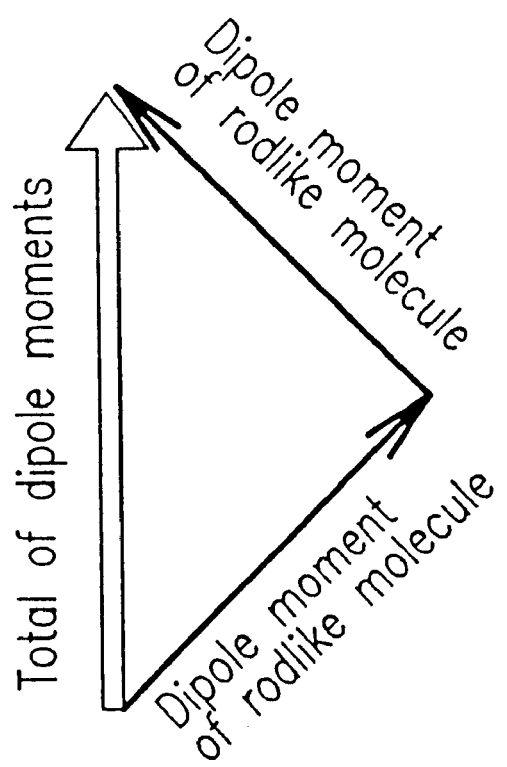
Figure 9A:
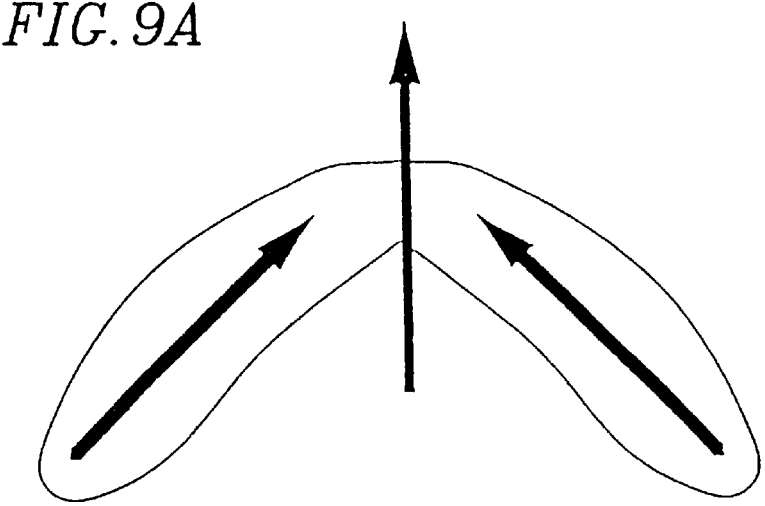
FIGS. 9A and 9B are schematic diagrams illustrating permanent dipole moment of a liquid crystal material according to another embodiment of the present invention.
Figure 9B:
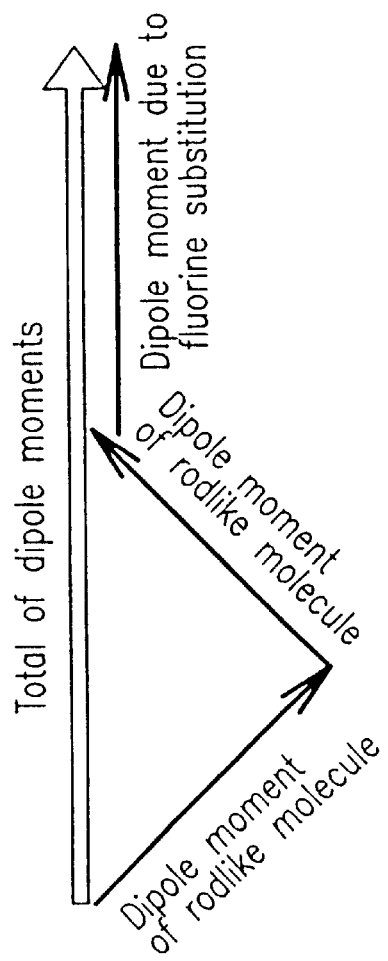
Figure 10A:
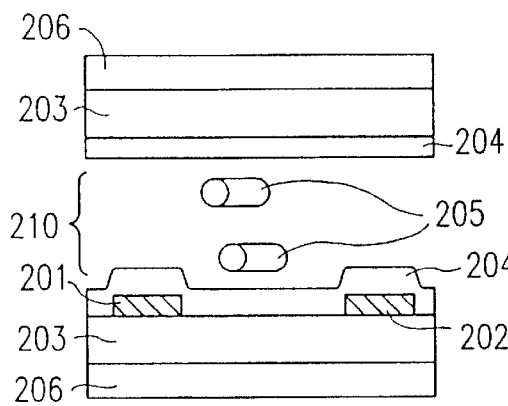
FIGS. 10A to 10D are schematic diagrams illustrating a configuration of a conventional transverse electric field type liquid crystal display device.
Figure 10B:
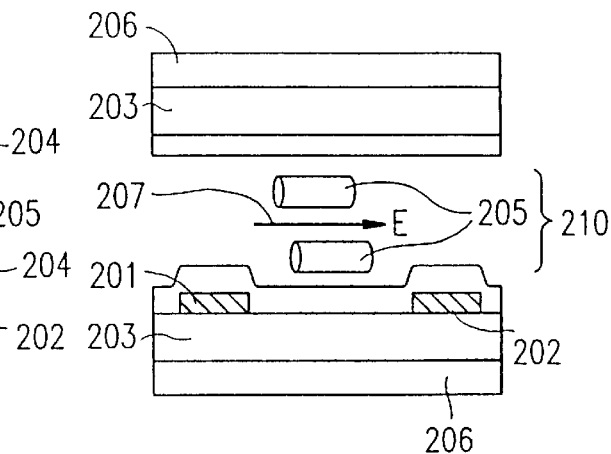
Figure 10C:
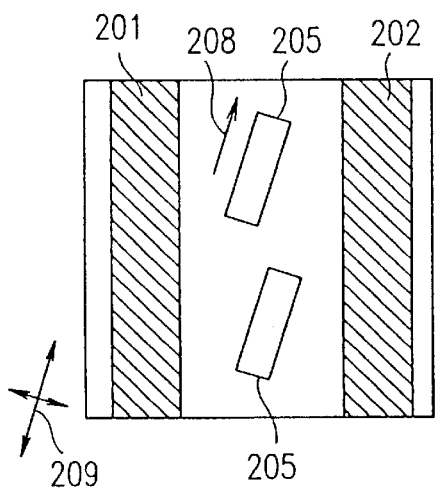
Figure 10D:
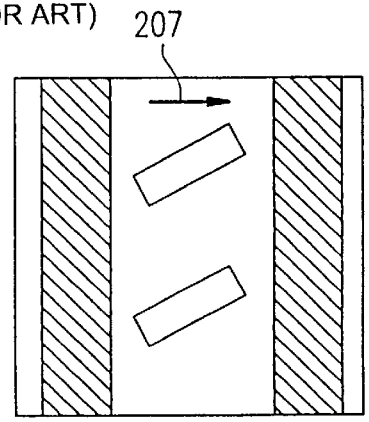

FIG. 8A is a schematic diagram illustrating dipole moments of rodlike portions and a linking portion of the liquid crystal material molecule represented by Formula 6; and FIG. 8B is a schematic diagram illustrating the permanent dipole moment of the liquid crystal material represented by Formula 6. FIG. 9A is a schematic diagram illustrating dipole moments of rodlike portions and a linking portion of the liquid crystal material molecule represented by Formula 7; and FIG. 9B is a schematic diagram illustrating the permanent dipole moment of the liquid crystal material represented by Formula 7.

The difference between the liquid crystal material represented by Formula 6 and that represented by Formula 7 is the presence of the permanent dipole moment due to the fluorine substituent at the center (i.e., a linking portion) of the banana-shaped molecule. As is apparent from comparing FIG. 8B with FIG. 9B, the permanent dipole moment of the Moreover, when each of the ring compounds listed in Tables 3 and 4 (e.g., compounds where $R_1$ is OH and $R_2$ is OH) is used instead of the compound having a fluorine-substituted phenyl group, the effect of increasing the permanent dipole moment of the liquid crystal material is similarly obtained, whereby a liquid crystal display device having a high aperture ratio and a high response speed is obtained.

Embodiment 5

A rodlike compound having a structure similar to that represented by Formula 1 was reacted with ethylene. The banana-shaped liquid crystal material represented by Formula 8 was obtained when the synthesis was performed so that the rodlike portion derived from the rodlike compound takes the cis form with respect to the ethylene group. The corresponding generally linear liquid crystal material was obtained when the synthesis was performed so that the rodlike portion derived from the rodlike compound takes the trans form with respect to the ethylene group.

Formula 8

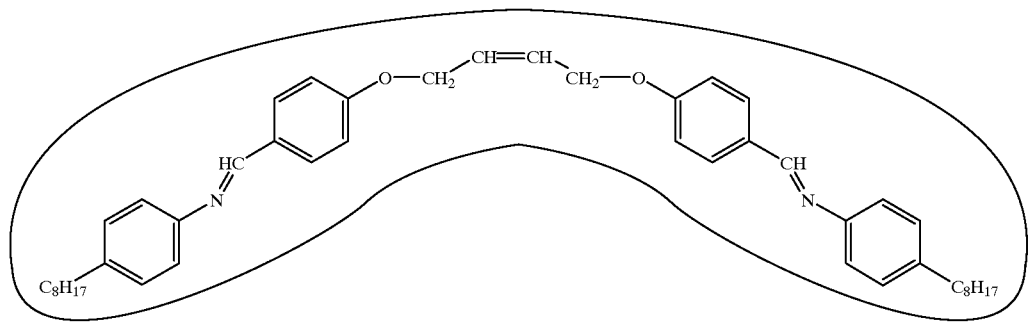

A liquid crystal display device as in Embodiment 1 was produced using the banana-shaped liquid crystal material represented by Formula 8, and the characteristics thereof were examined. As a result, it was possible to substantially increase the transmission thereof at a low voltage. Thus, a liquid crystal display device having a high aperture ratio was obtained. Moreover, it was possible to increase the response speed of the liquid crystal display device.

Moreover, a liquid crystal display device having similarly desirable characteristics was obtained when the ether compound as listed in Table 5 (e.g., ether compound where $R_3$ is $CH_3$ and $R_4$ is $CH_3$) was used instead of ethylene.

On the other hand, with a liquid crystal display device using the corresponding generally linear compound, a liquid crystal display device having such desirable characteristics was not obtained.

Embodiment 6

The banana-shaped liquid crystal material represented by Formula 9 was obtained by reacting the ketone compound as listed in Table 5 with a rodlike compound having a structure similar to that represented by Formula 1 under a suitable condition.

Formula 8). Thus, a liquid crystal display device having a high aperture ratio was obtained. Moreover, it was possible to increase the response speed of the liquid crystal display device.

As described above, according to the present invention, a transverse electric field type liquid crystal display device of a novel display mode having pixel size and driving voltage in a practical range, a high aperture ratio, a high contrast, and a high response speed is provided.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising: a pair of substrates; a liquid crystal layer provided between the substrates; and, for each pixel, at least one pair of transverse electric field generating electrodes which is capable of being driven in a matrix driving manner and which is provided on at least one substrate of the pair of substrates and is connected to external control means, Formula 9

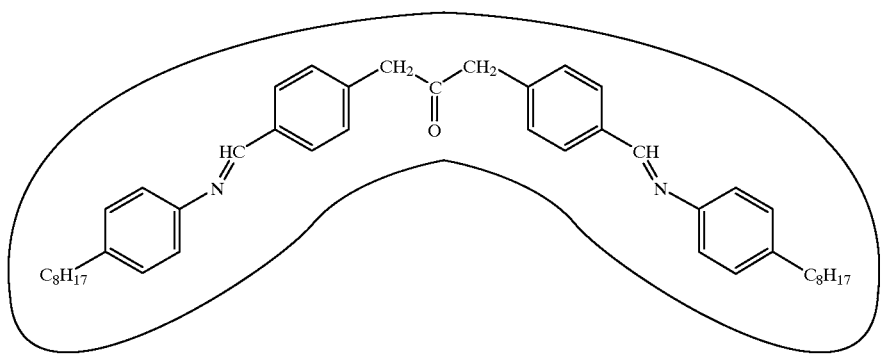

The liquid crystal material represented by Formula 9 had a permanent dipole moment greater than that of the liquid crystal material represented by Formula 8. A liquid crystal display device as in Embodiment 5 was produced using the liquid crystal material represented by Formula 9, and the characteristics thereof were examined. As a result, it was possible to substantially increase the transmission thereof at a voltage even lower than that in the liquid crystal display device according to Embodiment 5 (the liquid crystal display device using the liquid crystal material represented by wherein each substrate of the pair of substrates is provided with alignment means for aligning liquid crystal molecules in the liquid crystal layer so that the liquid crystal layer has spontaneous polarization generally parallel to a surface of the substrate, wherein the liquid crystal layer comprises a nematic liquid crystal material.

2. A liquid crystal display device according to claim 1, wherein the means for driving the transverse electric field generating electrodes is an active matrix driving means using an active element.

3. A liquid crystal display device according to claim 1, wherein the alignment means is an alignment film for which a predetermined alignment treatment is performed.

4. A liquid crystal display device according to claim 3, wherein the predetermined alignment treatment is a rubbing treatment.

5. A liquid crystal display device comprising: a pair of substrates; a liquid crystal layer provided between the substrates; and, for each pixel, at least one pair of transverse electric field generating electrodes which is capable of being driven in a matrix driving manner and which is provided on at least one substrate of the pair of substrates and is connected to external control means, wherein each substrate of the pair of substrates is provided with alignment means for aligning liquid crystal molecules in the liquid crystal layer so that the liquid crystal layer has spontaneous polarization generally parallel to a surface of the substrate, wherein the liquid crystal layer comprises a nematic liquid crystal material and the molecules of the nematic liquid crystal material have a banana-like or conical molecular shape including at least two rodlike portions derived from a rodlike compound, at least one of which exhibits liquid crystallinity, and a linking portion derived from a compound selected from an alcohol compound, a ring compound and a nonlinear compound.

6. A liquid crystal display device according to claim 5, wherein the linking portion is derived from a compound having a dipole moment.

7. A liquid crystal display device comprising: a pair of substrates; a liquid crystal layer provided between the substrates; and, for each pixel, at least one pair of transverse electric field generating electrodes which is capable of being driven in a matrix driving manner and which is provided on at least one substrate of the pair of substrates and is connected to external control means, wherein each substrate of the pair of substrates is provided with alignment means for aligning liquid crystal molecules in the liquid crystal layer so that the liquid crystal layer has spontaneous polarization generally parallel to a surface of the substrate, wherein the liquid crystal layer comprises a nematic liquid crystal material and the molecules of the nematic liquid crystal material have a molecular shape selected from a banana shape, a cone shape and a wedge shape.

8. A liquid crystal display device comprising: a pair of substrates; a liquid crystal layer provided between the substrates; and, for each pixel, at least one pair of transverse electric field generating electrodes which is capable of being driven in a matrix driving manner and which is provided on at least one substrate of the pair of substrates and is connected to external control means, wherein the liquid crystal layer comprises a nematic liquid crystal material, wherein each substrate of the pair of substrates is provided with alignment means for aligning liquid crystal molecules in the liquid crystal layer so that the liquid crystal layer has spontaneous polarization generally parallel to a surface of the substrate, and wherein the at least one pair of transverse electric field generating electrodes for each pixel substantially extends from one substrate of the pair of substrates to the other substrate.

9. A liquid crystal display device comprising: a pair of substrates; a liquid crystal layer provided between the substrates; and, for each pixel, at least one pair of transverse electric field generating electrodes which is capable of being driven in a matrix driving manner and which is provided on at least one substrate of the pair of substrates and is connected to external control means, wherein each substrate of the pair of substrates is provided with alignment means for aligning liquid crystal molecules in the liquid crystal layer so that the liquid crystal layer has spontaneous polarization generally parallel to a surface of the substrate, wherein the liquid crystal molecules in the liquid crystal layer are oriented in a spray orientation or in a bend orientation.

* * * * *